Aug. 4, 1942.  A. D. SIEDLE  2,291,768
REFRIGERATION
Filed Jan. 13, 1938   2 Sheets-Sheet 1

INVENTOR
Arnold D. Siedle
BY Harry S. Demarse
ATTORNEY

INVENTOR
*Arnold D. Siedle*
BY
*Harry S. Dumars*
ATTORNEY

Patented Aug. 4, 1942

2,291,768

UNITED STATES PATENT OFFICE 2,291,768

REFRIGERATION

Arnold D. Siedle, Canton, Ohio, assignor to The Hoover Company, North Canton, Ohio, a corporation of Ohio Application January 13, 1938, Serial No. 184,723

16 Claims. (Cl. 62—119.5)

This invention relates to refrigerating systems and more particularly to a cooling system and an arrangement of parts particularly designed for application to three-fluid absorption refrigerating systems.

The capacity of an absorption refrigerating system is directly dependent upon the efficiency of the means provided for rejecting heat from the liquid pre-cooler, absorber, rectifier, and condenser. The absorber, in general, will form the bottle neck of the entire refrigerating system; that is, the lower the temperature at which the absorber can be operated while still performing its absorbing function, the greater will be the capacity and efficiency of the refrigerating system.

The problem of cooling the absorber of a domestic absorption refrigerating system is particularly difficult because of the rigid space limitations within which the entire refrigerating apparatus must be housed. Furthermore, even when all the required apparatus is arranged so that it may be placed within the very limited space allowed therefor, it is very difficult to provide an arrangement permitting a free flow of a large volume of air across the absorber and other air-cooled portions of the refrigerator without first leading all or part of that air over high temperature portions of the refrigerating system which greatly decrease the heat absorptive capacity thereof. There is also a problem of arranging the various elements of the refrigerating system such as the boiler, analyzer, control mechanism, and gas burner in such fashion that these elements shall be readily accessible for test, installation or adjustment without in any way impairing the efficiency of the absorber or interfering with a free flow of cooling air thereover.

Previous arrangements have provided tortuous and throttled air ducts; therefore, the cooling effect has been impaired by the throttling action of the bends and obstructions in the air duct. Moreover, the cooling air has been heated by passing over or closely adjacent to high temperature elements such as the boiler.

Accordingly, it is an object of this invention to provide an absorption refrigerating system arranged within a domestic refrigerating cabinet in such fashion that cooling air is directed in a substantially straight line path over the heat rejecting portions of the system without contacting or flowing adjacent high temperature elements of the system.

It is a further object of the invention so to arrange the boiler assembly, the control mechanism, and the gas burner in such fashion that they are readily accessible and are not in the path of the cooling air stream whereby they neither throttle nor heat the air flowing through the cooling system.

According to the invention, the refrigerating cabinet is provided with a vertically extending rear duct which opens into a mechanism compartment in the bottom portion of the cabinet containing the absorber and the solution pre-cooler. A very large unobstructed opening is provided whereby cool air near the floor of the space within which the refrigerating cabinet is placed, may have unobstructed access into the duct to air cool the absorber and other elements of the refrigerating system without passing over or closely adjacent to heated portions of the refrigerating systems, such as the boiler.

Other objects and advantages of the invention will become apparent as the description proceeds when taken in connection with the accompanying drawings, in which.

Figure 1:
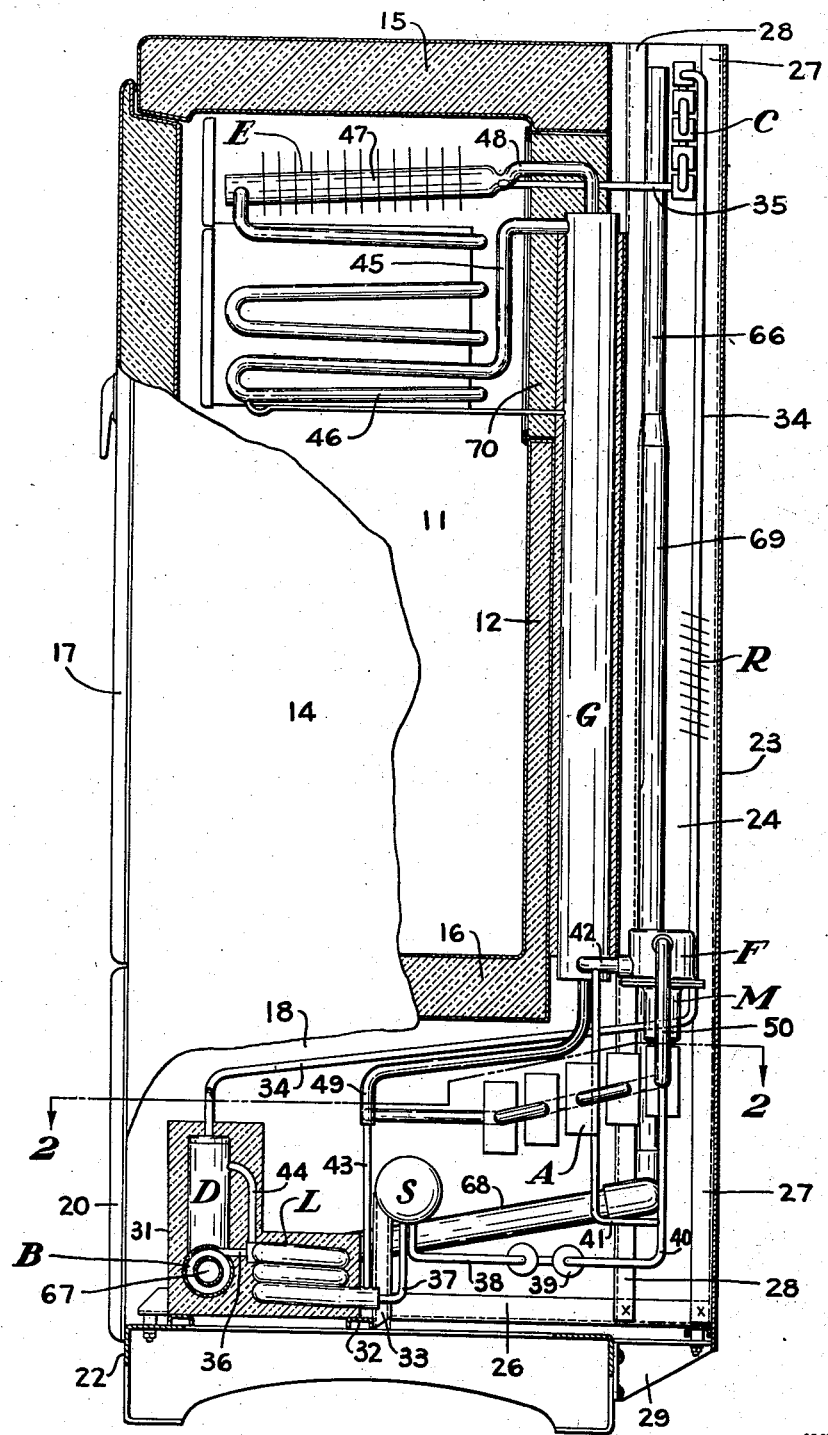
Figure 1 is a partial sectional elevational view of a refrigerating system mounted within a cabinet and embodying my invention.

The refrigerator cabinet is constructed with a storage compartment 11 defined by a rear wall 12, side walls 13 and 14, a top wall 15, a bottom wall 16, and an insulated door 17. All these walls are heavily insulated to inhibit heat transfer into the storage compartment. The side walls 13 and 14 are insulated only where they form the outer walls of the storage compartment 11 but they continue downwardly without insulation a considerable distance below the wall 16 to form a mechanism compartment 18 positioned below the storage compartment 11. The walls 13 and 14 are also brought around to form a front frame 19 which receives the door 17 and a readily removable closure 20 for a mechanism compartment opening 21. The cabinet structure rests upon a foot supporting member 22 to which it is attached in any suitable manner. The foot supporting member is formed as an open framework whereby there may be a free flow of air thereinto from the floor of the room in which the cabinet is placed.

A channel-shaped plate 23 is suitably attached to the ends of the side walls 13 and 14 of the refrigerator cabinet and forms an air duct 24 along the rear wall 12 of the storage compartment 11. The panel 23 continues downwardly along the rear of the mechanim compartment 18 for which it also forms a rear closure. A perforated cover plate may be applied to the upper end of the duct 24, if desired.

The refrigerating apparatus per se is suitably supported from a channel and angle iron framework which comprises a rectangular base portion 26 formed by joining, as by welding, a plurality of channel or angle iron elements. A pair of corner upright elements 27 are secured to the rear corners of the base frame 26 and extend upwardly in the duct 24 adjacent the panel 23 to the top thereof. A complementary pair of frame elements 28 are secured to the base frame 26 and extend upwardly in the duct 24 against the rear wall 12 of the storage compartment 11 and to the top thereof. Various cross braces and rigidifying elements may be applied if desired. The base frame 26 is secured to the cabinet foot element 22 in any suitable manner; as illustrated the front portions of the base frame are directly bolted to the foot element 22 and the rear corners of the base frame are bolted to extension plates 29 which are rigidly carried by the rear side portions of the foot element 22.

As illustrated, the refrigerating system comprises a boiler B, an analyzer D, a rectifier R, a condenser C, an evaporator E, a gas heat exchanger G, an absorber A, a solution reservoir S, a liquid heat exchanger L, and a circulating fan F driven by an electrical motor M, all suitably interconnected by various conduits to form a plurality of gas and liquid circuits.

As illustrated, the boiler, analyzer, and liquid heat exchanger are encased in a block of insulating material 31 which rests upon an end piece of the base frame 26 and a cross frame member 32 of the base frame. The solution reservoir S is suitably supported from a pair of upright members 33 which are joined to the cross frame member 32 in any suitable manner, as by welding. The other elements of the refrigerating system are supported from the frame element in any suitable or preferred manner.

The refrigerating system is charged with a refrigerant such as ammonia, an absorbent such as water, and an inert pressure equalizing medium, preferably a dense inert gas like nitrogen.

Refrigerant vapor generated in the boiler B by the application of heat passes upwardly through the analyzer D in counterflow relationship to strong solution passing downwardly therethrough. Refrigerant vapor is generated from the strong solution in the analyzer by the heat of condensation of absorption solution vapor formed in the boiler B. The refrigerant vapor is conveyed from the analyzer to the upper portion of the condenser by a conduit 34 which includes the air-cooled rectifier R. The rectifier causes condensation of any vapor of absorption solution which may pass through the analyzer. The condenser C includes a plurality of parallel end-connected conduits which are provided with air cooling fins whereby the refrigerant vapor supplied to the condenser is liquefied by heat exchange with ambient air and is discharged therefrom in liquid form through a conduit 35 into the upper portion of the evaporator E. If desired, the condenser C may be slanted or formed in any other suitable or desired manner.

The weak solution formed in the boiler is withdrawn therefrom through a conduit 36, liquid heat exchanger L, conduit 37, reservoir S, a conduit 38, a U-shaped finned air-cooled solution pre-cooler 39 and a conduit 40 which discharges into the upper portion of the absorber A. It is apparent that the liquid must be elevated into the absorber and for this purpose a gas bleed-off conduit 41 is connected between the discharge conduit 42 of the circulating fan F and the conduit 40 below the liquid level in the boiler-analyzer reservoir system whereby the weak solution is elevated into the absorber by gas-lift action.

The absorber A is formed of a plurality of individually finned air-cooled conduits serially connected at their ends to form a reversely bent continuous conduit. The absorber slopes slightly downwardly with the upper end thereof, which is positioned just beneath the bottom portion of the cooiling air duct 24, and the lower end thereof extends into the mechanism compartment 18. The weak solution flows downwardly through the absorber in counterflow relationship to a pressure equalizing medium refrigerant vapor mixture flowing upwardly therethrough and removes the refrigerant vapor from the pressure equalizing medium by absorption thereby forming strong solution. The heat of absorption is rejected to air circulating over the fins on the absorber. The strong solution formed in the absorber is conveyed therefrom to the upper portion of the analyzer D by means of a conduit 43, the liquid heat exchanger L and a conduit 44.

The pressure equalizing medium discharged from the fan F under pressure through the conduit 42 passes through the gas heat exchanger G and is conveyed therefrom into the bottom portion of the evaporator E by a conduit 45. The evaporator E may be of any desired form or construction. As illustrated, it comprises a lower tubular freezing section 46 and an upper finned box-cooling section 47 which is connected at its rear end to the conduit 35 previously described. The pressure equalizing medium flows upwardly through the evaporator sections in counterflow relationship to liquid refrigerant flowing downwardly therethrough. The liquid refrigerant evaporates or diffuses into the pressure equalizing medium to produce refrigeration. The rich pressure equalizing medium refrigerant vapor mixture formed in the evaporator is conveyed therefrom through a conduit 48, gas heat exchanger G, and a conduit 49 into the lower end of the absorber A through which it flows upwardly in counterflow to the absorption solution as previously described. The lean inert gas formed in the absorber is conveyed therefrom by a conduit 50 into the suction inlet of the circulating fan F.

Figure 2:
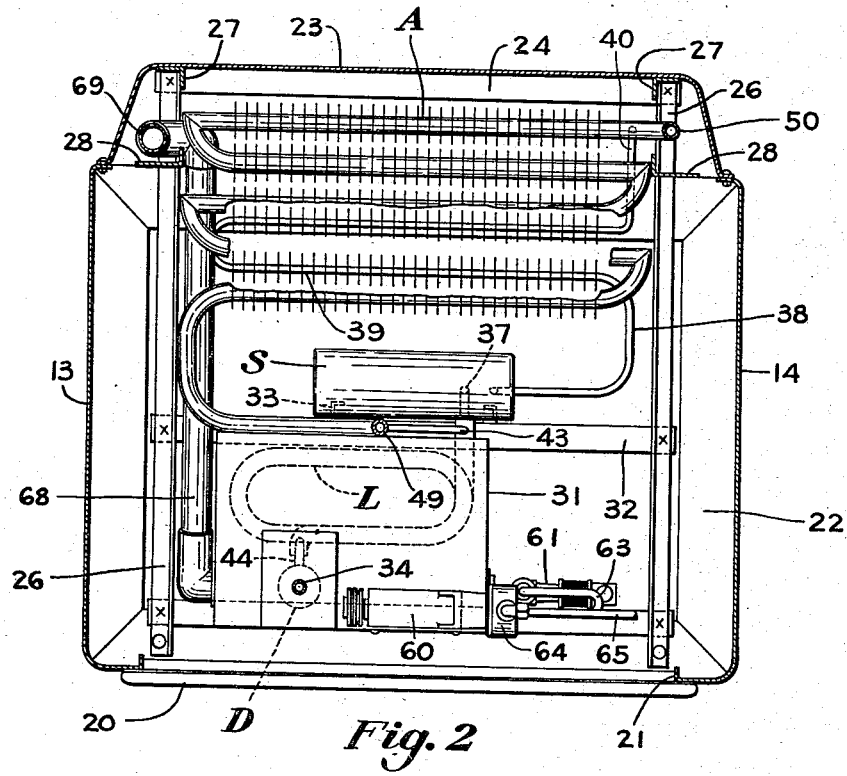
Figure 2 is a transverse sectional view taken substantially on the line 2—2 of Figure 1 and looking in the direction of the arrows.
Figure 3:
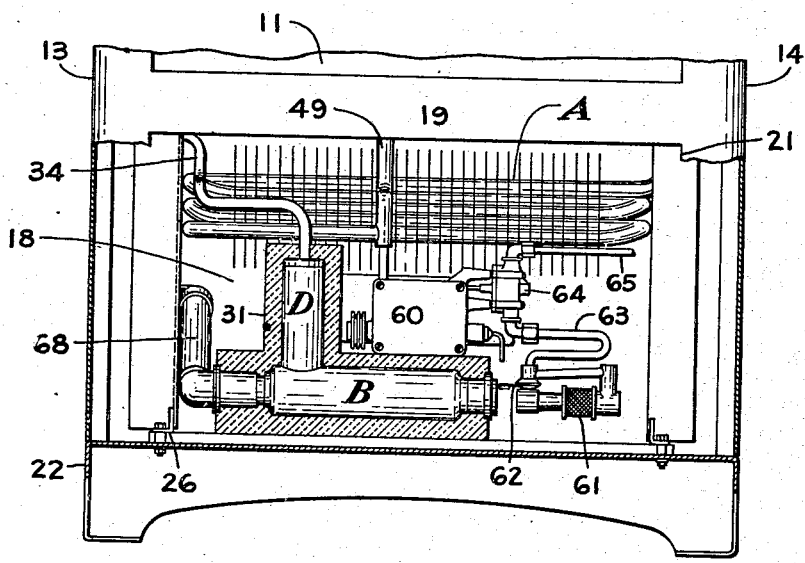
Figure 3 is a partial sectional view of the lower portion of the refrigerating cabinet looking into the interior of the mechanism compartment.

As illustrated in Figure 2, a control mechanism 60 is mounted upon the insulation 31 of the boiler-analyzer. A gas burner 61 including a safety cut-off mechanism 62 is connected by a conduit 63 to a control valve 64 which is carried by the control mechanism 60. Gas is supplied to the valve 64 through a supply conduit 65. The control mechanism is designed simultaneously to control the operation of the gas burner 61 and the electrical motor M. A preferred control mechanism is illustrated and described in the co-pending application of Curtis C. Coons, Serial No. 148,424, filed June 16, 1937, Patent No. 2,228,343.

The flame of the burner is projected into the central conduit 67 of the boiler B which communicates with a products of combustion discharge flue 68. The flue 68 extends rearwardly along one side wall of the compartment 18 and connects to a vertically extending flue 69 which extends upwardly in one corner of the air duct 24. The flue 69 merges with a distributing flue 66 of any desired type adjacent the upper portion of the air duct 24. The distributing flue extends substantially to the top portion of the air duct 24 and serves to distribute the relatively warm products of combustion over a large area in the upper portion of the duct 24 but without permitting the warm products of combustion to interfere with the cooling air. If desired, the flues 68 and 69 may be insulated. The warm products discharged by the distributor 66 at the top portion of the duct 24 aid in inducing cooling air flow but without impairing the cooling efficiency of the duct 24.

The arrangement of the various elements of the refrigerating system is of considerable importance and will now be described in some detail. It is apparent that the boiler-analyzer system extends across the mechanism compartment and at the front portion thereof; this positions the burner and control mechanism directly in the front portion of the apparatus where they are readily accessible simply by removing a mechanism compartment door 20. Also these elements are positioned as remotely as possible from the air-cooling system in order that they may not interfere with it. The flue system for disposing of exhaust products of combustion is positioned in the corners and side walls of the mechanism compartment and the air-cooling flue whereby to interfere as little as possible with the cooling air flowing through these compartments.

The absorber extends downwardly from the bottom portion of the duct 24 into the mechanism compartment and at the rear thereof. It is apparent that there is an unobstructed flow of air from the floor of the room upwardly through the foot element 22 and between the plates 29 into the mechanism compartment 18 and the duct 24. The air passing upwardly through the element 22 passes first over the solution pre-cooler 39 and then the lower portion of the absorber A from which portion it deflects slightly rearwardly into the bottom portion of the duct 24. The air passing into the duct 24 from between the plates 29 passes directly upwardly over the upper end of the absorber, the rectifier R and the air-cooled condenser C. It is to be noted that the cooling air is heated at four points, namely, the solution pre-cooler 39, the absorber A, the rectifier R, and the condenser C. This progressive heating of the cooling air induces a strong vigorous flow of air through the cooling system and counteracts the cooling effect of the rear plate 23 of the cabinet structure which would tend to cool the air in the higher portions of the flue 24 and to block air flow therethrough; furthermore, the arrangement is such that the absorber, which is the most difficult of the elements to cool by air, is arranged to receive over the extended surface thereof, a very large volume of the relatively cool air adjacent the bottom portion of the refrigerator cabinet.

The gas heat exchanger G is suitably insulated and is partially recessed in the rear wall 12 of the storage compartment 11. The gas heat exchanger extends into a complementary recess formed in a window element 70 which supports the evaporator structure and receives the conduits 35, 45 and 48. The window structure 70 is also suitably supported from the mechanism framework whereby the entire refrigerating system may be slid into the cabinet from the rear after which the rear plate 23 is secured in place.

The circulating motor M and the fan F are positioned on the side of the air duct 24 opposite to the products of combustion flue. The air which cools the flue and motor flows upwardly at the extreme opposite sides of the air duct 24. The absorber and condenser do not extend into the corners of the air duct, therefore, the motor and flue do not throttle the flow of or heat the cooling air flowing over the absorber and condenser.

It is apparent from the description and illustration that I have devised a refrigerating system wherein the parts are arranged to be readily accessible for servicing, repair or assembly and a large air-cooling flue is provided having free direct connection to the cool air on the floor of the room adjacent the bottom portion of the refrigerating cabinet whereby a large freely flowing body of relatively cool air is caused to sweep in a direct path across the various air-cooled elements of the refrigerating system without interference from the relatively hot portions of the system associated with the boiler or the waste products of combustion from the heating burner. This arrangement provides a highly efficient cooling system and places the high temperature elements of the system in the most accessible position while preventing them from interfering in any way with the cooling system.

While I have illustrated and described only one embodiment of my invention, it is capable of expression in other constructional forms and variations without departing from the spirit thereof or the scope of the appended claims.

I claim:

1. Refrigerating apparatus comprising a cabinet structure including an insulated storage compartment spaced from the bottom and one wall thereof to form a connected air flue and mechanism compartment, said cabinet being supported upon a foot member which is constructed to permit free flow of cooling air into the bottom portion of said mechanism compartment and said cooling flue, a solution pre-cooler positioned in the bottom portion of said mechanism compartment, an inclined tubular air-cooled absorber positioned in said mechanism compartment and extending below the bottom portion of said air flue, a condenser in the upper portion of said air flue, a boiler, a liquid heat exchanger, and a heater for said boiler, said heater, heat exchanger, and boiler being positioned in said mechanism compartment and arranged laterally of said absorber and said flue to allow a generally vertical flow of cooling air through the bottom of said compartment and over said air-cooled elements.

2. An air-cooled refrigerator comprising a cabinet having an insulated food compartment, means providing for flow of cooling air upwardly in the rear of said insulated compartment, an air-cooled absorber having a portion thereof positioned beneath said insulated compartment and another portion thereof positioned in the lower portion of said air flow means, and means providing a direct substantially straight and unobstructed path for flow of cooling air through the base of said refrigerator, over said absorber and into said air flow means, said apparatus being so constructed and arranged that cooling air may flow in a substantially vertical path to all parts of said absorber.

3. Refrigerating apparatus comprising a cabinet, a storage chamber in said cabinet, a mechanism compartment beneath said chamber, a generator extending across the front portion of said compartment, an air cooled absorber in the rear portion of said compartment, and an air flue extending vertically from the location of said absorber, the bottom of said compartment being arranged to admit cooling air beneath said absorber.

4. A refrigerator comprising a cabinet having an insulated food compartment, a lower apparatus compartment, a vertically extending cooling-air compartment, and a refrigerating apparatus having a portion thereof in said lower compartment, a heat rejecting portion thereof in said cooling-air compartment, and a portion thereof in said food compartment, the portion thereof in said lower compartment including a boiler, and a plurality of heat rejecting elements extending beneath said cooling-air compartment, and air-cooling fins mounted on each of said heat rejecting elements, the arrangement being such that cooling air may flow directly from the bottom of said cabinet over the heat rejecting elements without being obstructed by said boiler.

5. Refrigerating apparatus comprising a cabinet, a storage chamber in said cabinet, a mechanism compartment beneath said chamber, a generator extending across the front portion of said compartment, an absorber in the rear portion of said compartment, an air duct communicating with said compartment and extending to the top portion of said cabinet, the bottom of said compartment being open to allow cooling air to flow upwardly over said absorber and through said air duct, a condenser in said air duct, and a power-driven circulator mounted to be cooled by air flowing through said duct, the arrangement being such that the air cooling said circulator does not traverse said absorber and said condenser.

6. Refrigerating apparatus comprising a cabinet, a storage chamber in said cabinet, a mechanism compartment beneath said chamber, a generator extending across the front portion of said compartment, a heater for said generator adjacent the front portion of said compartment, an absorber in the rear portion of said compartment, and a readily removable closure for the front portion of said compartment adapted to expose said generator and said heater.

7. An air-cooled refrigerator comprising a cabinet having an insulated storage compartment, an evaporator in said compartment, a condenser outside said compartment, an absorber beneath said compartment, a generator containing a refrigerant in solution in an absorbent, and conduits interconnecting said generator, condenser, evaporator, and absorber to form a system, said system including means for circulating an auxiliary agent between the evaporator and absorber in the presence of which the cooling agent evaporates, means providing for a direct substantially unobstructed vertical flow of cooling air upwardly over said absorber and said condenser, and means mounting said generator out of the path of said cooling air.

8. Refrigerating apparatus comprising a cabinet, a storage chamber in said cabinet, a mechanism compartment beneath said chamber, a generator extending across the front portion of said compartment, an absorber in the rear portion of said compartment, an air duct communicating with said compartment and extending to the top portion of said cabinet, the bottom of said compartment being open to allow cooling air to flow upwardly over said absorber and through said air duct, a condenser in said air duct, a gas burner positioned adjacent one end of said generator to apply heat thereto, and means for discharging products of combustion from said burner, said means being constructed and arranged to distribute said products over a large area at the top of said cabinet without appreciably heating cooling air flowing upwardly through said compartment and duct or interfering with the flow thereof.

9. Absorption refrigeration apparatus comprising a cabinet, an insulated food box in said cabinet, an open bottom mechanism compartment beneath said box opening into an air duct extending vertically along the rear portion of said box, an evaporator in said box, a condenser in said flue, a generator in the front portion of said compartment and an absorber in the rear portion of said compartment, a gas burner for heating said generator positioned in the front portion of said compartment, a power-driven fluid circulator on one side of said duct and a products of combustion flue for said burner positioned on the other side of said duct, the arrangement being such that air in said duct flowing over said power-driven circulator and flue does not flow over said absorber and condenser.

10. A refrigerator comprising a cabinet having an insulated food compartment, an air passageway extending vertically alongside said compartment, a condenser in said air passageway, an absorber comprising a plurality of finned conduits positioned beneath said air passageway, an insulated generator analyzer and solution heat exchanger assembly positioned below and laterally of the bottom portion of said passageway, and an unobstructed air inlet in said cabinet directly beneath said passageway.

11. Refrigerating apparatus comprising a cabinet, an insulated compartment mounted in said cabinet, an apparatus compartment beneath said insulated compartment, a boiler extending across the front portion of said apparatus compartment, an absorber in the rear portion of said apparatus compartment, a heater for said boiler, and a conduit for conveying products of combustion from said heater to the upper portion of said cabinet, the bottom portion of said cabinet beneath substantially the entire extent of said absorber being open to permit free flow of cooling air thereinto.

12. An absorption refrigerating apparatus comprising a cabinet structure including a mechanism chamber providing a substantially vertical path of flow for cooling air and a storage chamber, a refrigerating mechanism including a cooling unit, an air-cooled condenser, an air-cooled absorber and a generator connected in circuit, said cooling unit being located in said storage chamber, said condenser located in the upper portion of said cooling air path, said absorber located in the lower portion of said cooling air path, and said generator located below and laterally of said vertical cooling air path.

13. An absorption refrigerating apparatus comprising a cabinet structure including a mechanism chamber providing a substantially vertical path of flow for cooling air and a storage chamber, a refrigerating mechanism including a cooling unit, an air-cooled condenser, an air-cooled absorber and a generator connected in circuit, said cooling unit being located in said storage chamber, said condenser located in the upper portion of said cooling air path, said absorber located in the lower portion of said cooling air path, said generator located beneath said storage chamber and laterally of said absorber whereby said generator is positioned remotely from said vertical path of flow for cooling air, and a heater for said generator located remotely from said vertical cooling air path and adjacent the front part of said cabinet whereby it is readily accessible for servicing and adjustment.

14. An absorption refrigerating apparatus comprising a cabinet structure including a mechanism chamber providing a substantially vertical path of flow for cooling air and a storage chamber, a refrigerating mechanism including a cooling unit, an air cooled condenser, an air cooled absorber, a motor driven fluid circulator, and a generator connected in circuit, said cooling unit being located in said storage chamber, said condenser located in the upper portion of said cooling air path, said absorber located in the lower portion of said cooling air path, and said generator located laterally of said absorber whereby said generator is positioned remotely from said vertical cooling air path, said circulator being positioned in said vertical cooling air path out of vertical alignment with said absorber and said condenser.

15. Absorption refrigerating apparatus comprising a cabinet including a storage chamber and a mechanism chamber having a cooling air flue, a refrigerating mechanism including a generator, an absorber, a condenser, an evaporator and an electric motor driven fluid circulator connected in circuit, said condenser, said absorber, and said electric motor driven fluid circulator being located in said cooling air flue, said electric motor driven fluid circulator being positioned laterally of said absorber and condenser whereby cooling air which traverses said absorber and condenser does not flow across said circulator.

16. Absorption refrigerating apparatus including a housing, an air-cooled solution pre-cooler, a generator, an air-cooled absorber and an air-cooled condenser in said housing, said housing being arranged to provide a substantially straight line unobstructed air duct for said pre-cooler, absorber, and condenser, and a generator within said housing positioned out of the path of air flowing through said air duct.

ARNOLD D. SIEDLE.